July 27, 1954

L. A. TROFIMOV 2,684,743

CENTRIFUGALLY OPERABLE CLUTCH

Filed March 31, 1947

INVENTOR.
Lev A. Trofimov
BY
Harry P. Canfield

ATTORNEY

July 27, 1954  L. A. TROFIMOV  2,684,743
CENTRIFUGALLY OPERABLE CLUTCH
Filed March 31, 1947  3 Sheets-Sheet 2

INVENTOR
Lev A. Trofimov
Harry P. Canfield
ATTORNEY

July 27, 1954  L. A. TROFIMOV  2,684,743
CENTRIFUGALLY OPERABLE CLUTCH
Filed March 31, 1947  3 Sheets-Sheet 3

INVENTOR.
Lev A. Trofimov
BY Harry R. Canfield
ATTORNEY

Patented July 27, 1954

2,684,743

UNITED STATES PATENT OFFICE 2,684,743

CENTRIFUGALLY OPERABLE CLUTCH

Lev A. Trofimov, Willoughby, Ohio, assignor to Fairchild Engine and Airplane Corporation, a corporation of Maryland Application March 31, 1947, Serial No. 738,372

9 Claims. (Cl. 192—105)

This invention relates to power transmissions, which are, in general, of the clutch class.

More particularly, the invention relates to clutch class transmissions of the type comprising a rotary power-driven part, and a rotary load-driving part, and which transmit torque variably from one to the other.

There are known devices of this type in which the power-driven part drives the load-driving part by friction, and the transmitted torque is varied by decreasing or increasing the friction, to permit one part to frictionally slip more or less on the other. Such devices are objectionable and unsatisfactory because of the wearing away, and, in some operative conditions, the burning, of the frictionally engaged parts, and the consequent rapid deterioration thereof, and the necessity of frequent overhauling and repairs.

In another known type, frictional wear has been eliminated by transmitting the torque through a dynamic fluid coupling, or through a magnetic field coupling; but this type is objectionable because there is always slip between the two parts, and direct positive transmission of torque, which is often desirable, is impossible.

Both of these types, and all others of which I am aware, have an operative insufficiency, in that the torque transmitted does not vary in desirable correspondence with different loads, or variations of a given load, driven by the load-driving part; and have the even more important defect that when the power-driven part is driven by a motor and the motor is started from rest, transmission of torque begins and becomes a load upon the motor before the motor has accelerated up to efficient working speed.

It is among the objects of the present invention:

To provide a power transmission generally in which power is transmitted through a thick film of liquid in an improved manner, by internal friction within the film; and in which the film is formed and maintained in an improved manner;

To provide an improved transmission generally of the clutch class in which transmission of torque therethrough is delayed until the driving motor (when started from rest) has accelerated up to a predetermined speed, preferably full speed; and by which thereafter or concurrently therewith, transmission of torque is initiated and accelerates the driven load;

To provide a transmission of this class in which after the motor has accelerated and the load has subsequently been accelerated, it may be driven without slip between the power-driven part and the load-driving part so long as the load is less than a predetermined maximum value, and in which, upon increase of the load above that value, slip occurs between the two said parts;

To provide a transmission of this class having improved means for predetermining the amount of transmitted torque at which said slip begins;

To provide a transmission of this type in which when slip occurs as aforesaid, transmission of torque between the two said parts is effected through a film of liquid (such for example as oil) in an improved manner and without frictional wear of the relatively slipping parts;

To provide a transmission of this type by which the power drawn from the driving motor can never exceed a safe maximum value, regardless of variations of the driven load, whereby in the case of an electric motor, the current supplied thereto can never exceed a safe value;

To provide a transmission of this type in which the torque transmitted is automatically varied in response to changes of motor speed effected by changes of driven load, in an improved manner.

Other objects will be apparent to those skilled in the art to which the invention appertains.

The invention is fully disclosed in the following description taken in connection with the accompanying drawing, in which.

Figure 1:
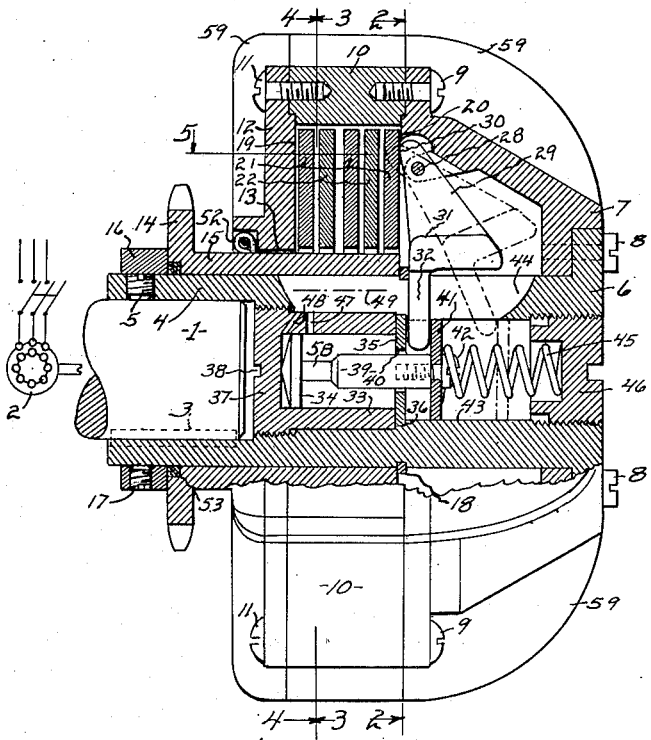
Fig. 1 is a view of an embodiment of the invention, with the upper and central parts in longitudinal section; and the view may be considered as a broken sectional view from the plane 1—1 of Fig. 4.
Figure 2:
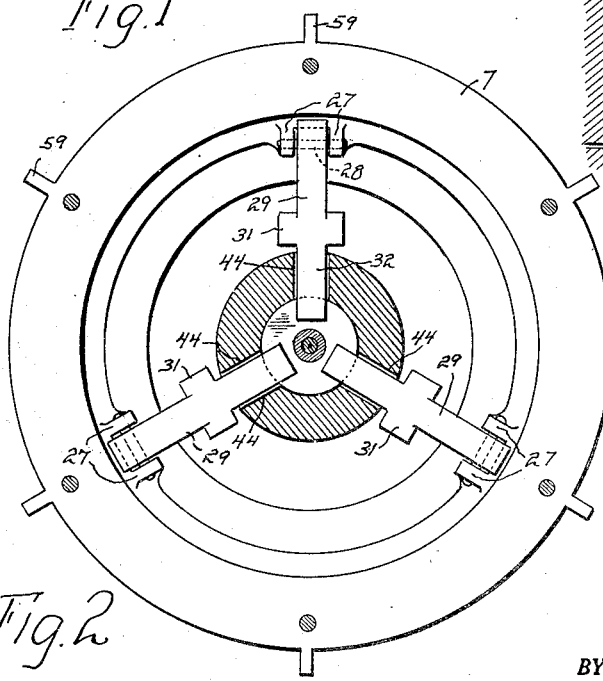
Fig. 2 is a sectional view from the plane 2—2 of Fig. 1.
Figure 5:
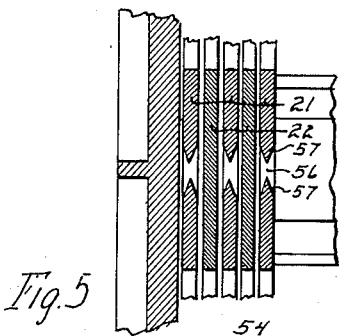
Figure 6:
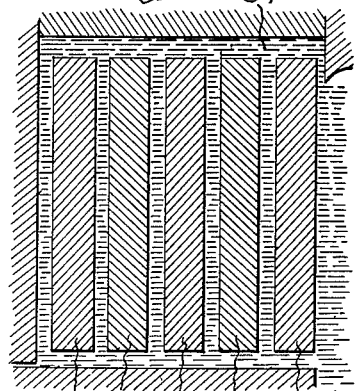
Figure 7:
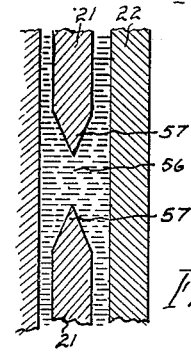
Figure 3:
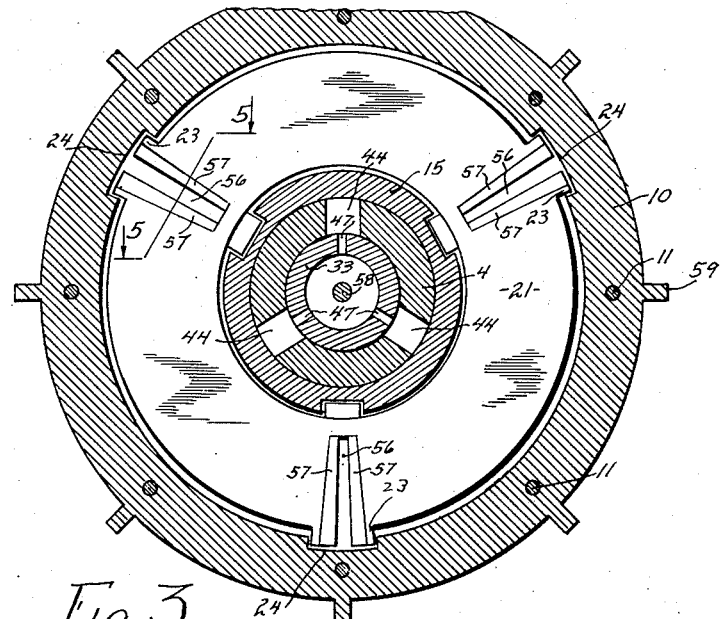
Fig. 3 is a sectional view from the plane 3—3 of Fig. 1.
Figure 8:
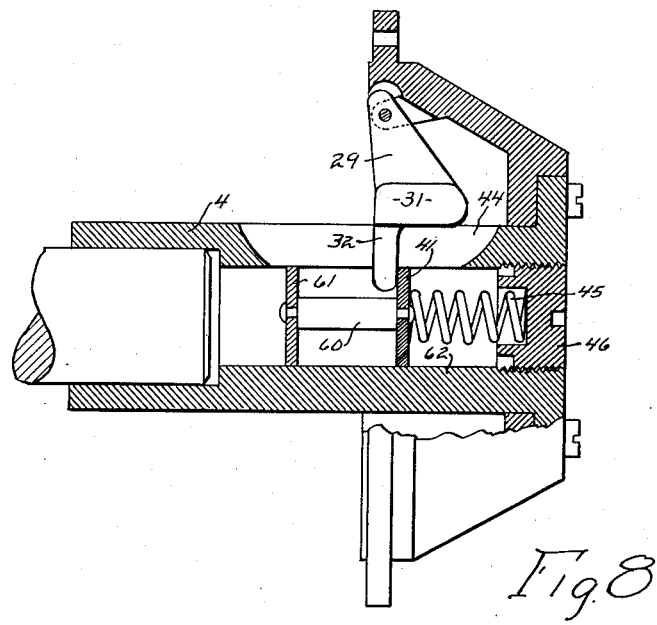
Figure 9:
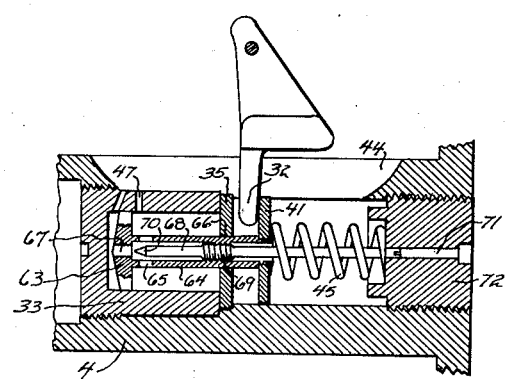

Fig. 5 is a view showing a feature of certain disc elements of Fig. 1; the view being a fragmentary sectional view taken from the plane 5 of Fig. 1, but with the disc elements of that figure rotated through 60°; or the view may be considered as taken from the plane 5—5 of Fig. 3;

Fig. 6 is a fragmentary view to enlarged scale of certain disc elements of Fig. 1, showing oil submerging them omitted from Fig. 1;

Fig. 7 is a fragmentary view similar to a part of Fig. 5 showing disc elements thereof submerged in oil omitted from Fig. 5;

Fig. 8 is a view of certain parts of Fig. 1, illustrating a modification thereof;

Fig. 9 is a view of certain other parts of Fig. 1, illustrating an adjustment that may be employed.

Referring to the drawing, I have shown at 1 the end of a power supplying shaft which may be the shaft of an electric motor 2 (shown to smaller scale). Mounted upon the shaft 1, and supported thereby, and rotating therewith, is the transmission as a whole to be described.

The shaft 1 is inserted into and keyed by a key 3 (or by splines if preferred) to one end of a tubular core 4, and fixed against longitudinal movement therein by a set screw 5.

The opposite end of the tubular core 4 has a circular flange 6 overlapping and secured to a housing element 7, by a circular series of screws 8—8 two only being shown.

The housing element 7 is generally bowl-shaped and at its outer periphery is secured by a circular series of screws 9—9 to one side of an annular housing element 10 co-axial with the core 4. At the other side of the annular housing element 10 it is connected by a circular series of screws 11—11 to a disc-like housing element 12 having a bearing bore 13 co-axial with the core 4.

A sprocket wheel 14 has a tubular hub 15 rotatable on the outer wall of the core 4 as a bearing therefor and rotatable within the bore 13; and is prevented from shifting axially in one direction by a collar 16 on the core 4 upon which the sprocket wheel 14 abuts, and which is telescoped over the core 4 and secured thereof by a set screw 17; and is held against axially shifting in the other direction by a split retaining ring 18 upon which the inner end of the hub 15 abuts, and which is seated in a corresponding annular groove in the outer wall of the core 4. If preferred, the sprocket wheel 14 and hub 15 may be separate parts secured together.

The sprocket wheel 14 is, in practice, connected by a sprocket chain, not shown, to a load to be driven not shown; and as will be understood, instead of a sprocket wheel and chain for this purpose, there may be substituted for the sprocket wheel a gear to be meshed with a gear associated with the load, or there may be substituted a belt pulley to be connected by a belt to the load, etc. etc., such possible modifications being understood by those skilled in the art.

Upon rotation of the shaft 1, the core 4 and housing parts 7, 10, 12 will be rotated in unison thereby, and may be considered as constituting the power-driven part or power input part of the transmission as referred to hereinbefore; and the sprocket wheel 14 and hub 15 may be considered as the load-driving part or power take-off part referred to; and transmission between the two is effected and controlled as will now be described.

The housing elements 12 and 7 have spaced apart radial annular surfaces 19 and 20 respectively, inwardly of the annular element 10 and between these surfaces is disposed a number or tier of annular discs, five being shown, and of two kinds, three discs 21—21—21 of one kind alternating with two discs 22—22 of the other kind.

These discs are all preferably of uniform thickness and each has opposite faces, preferably flat or planar, and the discs are of such number and thickness that when evenly distributed between the surfaces 19 and 20, they have spaces between them.

Each of the three discs 21—21—21 of one set has a number such as three tongues 23—23—23 extending radially outwardly from their outer peripheries and engaged in corresponding keyways 24 in the annular element 10. Each of the discs 22—22 of the other set has tongues 25 extending radially inwardly from their inner peripheries, engaged in corresponding keyways 26 in the outer wall of the hub 15. The tongue and keyway engagement in both cases is loose, whereby the discs are free to shift axially, and align themselves radially, but the discs 21 are constrained to rotate in unison with the annular element 10 of the power-driven part, and the discs 22 are constrained to rotate in unison with the hub 15 and sprocket 14 of the load-driving part.

As will be described, the discs may all be shifted axially and pressed together and against the housing surface 19, and then effect direct transmission between the shaft 1 and the sprocket 14, or may be mutually spaced apart and then provide slip transmission between said two parts, through films of oil between adjacent pairs of disc faces.

Projecting inwardly from the housing element 7 are three pairs of bearing lugs 27—27—27, each pair supporting, by means of a bearing pin 28, a centrifugal arm 29. Above the bearing, the arm has a cam 30 normally engaged with the adjacent face of the axially outermost disc 21, whereby upon rocking of the arms on their bearings the cams will move the said outermost disc inwardly toward the said face 19, and cause the discs to be closer together, or move the discs all into engagement with each other and with the face 19.

Each arm inwardly of its bearing has a weight 31 thereon and, inwardly of the weight, a finger 32, the center of gravity of the weight being always axially outwardly of the bearing, whereby when the housing as above identified is rotated, the weights tend to move away from the axis of rotation and effect the above described cam action.

The purpose of the arm fingers 32 is as follows:
Within the core 4 is a cylinder 33 and a piston 34 therein, and these may be variously constructed. In the construction shown in Fig. 1, the cylinder has a head 35 seated against an annular shoulder 36 in the tubular core 4. The cylinder proper 33 is a separate cup-form piece and is externally threaded in the inner wall of the core and has a cup bottom 37 provided with a slot 38 by which it may be screwed into place against the head 35 by a screw-driver inserted into the core, before the shaft 1 is inserted thereinto.

The piston has a piston rod 39 extending through a hole 40 in the head 35, and outwardly thereof has a disc-like flange 41 attached thereto by a screw 42 and spaced from the cylinder head 35 when the piston is in the normal retracted position shown. The disc-like flange 41 is preferably circular and has a sliding fit in a cylindrical bore 43 in the core 4. The flange 41 thus supports and guides the outer end of the piston rod 39.

The tubular core 4 has three openings 44—44—44 through its wall, and the centrifugal arm fingers 32 extend through these openings and into the space between the head 35 and flange 41; and upon centrifugal rocking of the arms 29, the fingers in engagement with the flange 41 propel the piston 34 outwardly in its cylinder. The arms and flange are shown in solid line in normal position and in broken line in an extreme rocked position.

A compression spring 45 abuts at one end on the flange 41 and at its other end upon a spring tension adjusting screw 46 threaded into the end of the tubular core 4, and incidentally closing that end of the core.

The cylinder has three ports 47 through its wall, disposed to be uncovered by the piston 34 in its innermost or normal position illustrated, and the ports 47 communicate with the openings 44 in the wall of the tubular core. The hole 40 in the head 35 is larger than the piston rod 39 and provides escapement for the contents of the cylinder for retarding forward movement of the piston 34 to introduce a time delay interval. A port 48 is provided in the cylinder wall communicating with the cylinder behind the piston to prevent sticking of the piston by vacuum suction.

Figure 4:
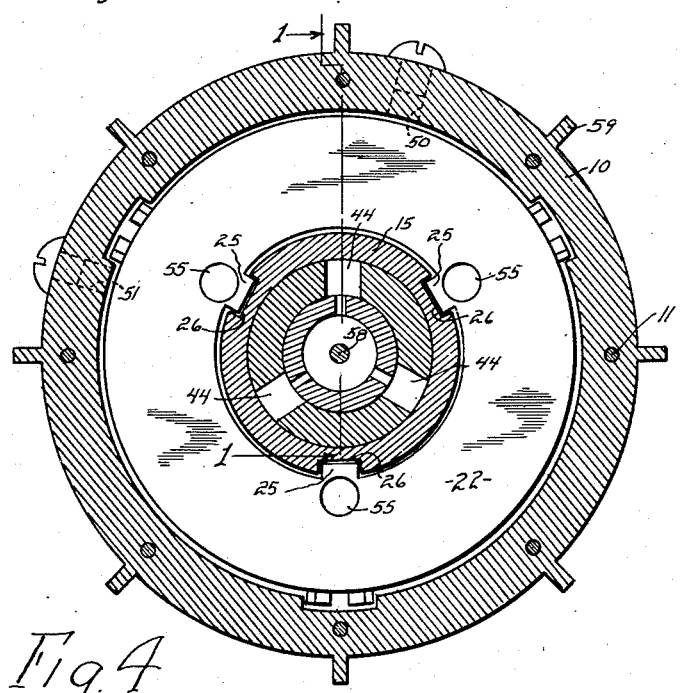
Fig. 4 is a sectional view from the plane 4—4 of Fig. 1.

When the parts of the device are assembled as illustrated in Fig. 1, they provide a closed chamber comprising the parts 4, 7, 10, 12, 15; and the parts 12, 10 and 7 provide an inwardly open annular concavity as shown; and oil or other suitable liquid is supplied to the chamber as a whole, up to a level above the cylinder 33 for example up to the level indicated at 49, Fig. 1. This preferably is done by supplying oil through a plug closable filling orifice 50 when it is disposed at the top of the device, and until the oil begins to run out of a lower plug closable orifice 51 at the side, see Fig. 4. Oil is prevented from escaping along the outside of the hub 15 and along the core 4 by suitable or well known annular packing devices, 52 and 53 respectively. The oil as it rises fills the cylinder 33 flowing into it through the lower ports 47 and displacing air from the upper port 47.

In the operation of the transmission above described, it will be assumed first that a load to be driven is connected to the sprocket wheel 14 and holds it at rest; and that the shaft 1 is connected to the motor 2 and is at rest.

The motor is now connected to its supply mains and starts to accelerate. The aforesaid housing or power-driven part is rotated and accelerates. The set of discs 22—22 remain at rest and the set of discs 21—21—21 rotate with the housing. The oil in the rotating housing is moved outwardly by centrifugal force and forms in an annular mass or ring 54 within the said annular concavity. The discs rotating in this oil tend to move axially apart and to be substantially equally spaced; and oil flows into the spaces between them and forms in thick oil films therebetween.

As acceleration proceeds, the weights 31 tend to move outwardly, and the cams 30 tend to move the discs closer together, and tend to make the oil films therebetween thinner, and the films tend to become thin enough to begin to transmit torque, between the rotary and the stationary sets of discs, and tend to finally come into direct contact with each other.

To avoid confusion in the drawing the oil above referred to is omitted from the construction figures, but is shown in Figs. 6 and 7 to enlarged scale and fragmentarily, these figures as will be apparent corresponding respectively to the upper part of Fig. 1 and to a part of Fig. 5.

The action of this oil-film torque transmission between discs is that described in my co-pending application, Serial No. 592,746, filed May 9, 1945, now Patent No. 2,576,156, wherein are set forth the phenomena and characteristics of "thick" films, by which torque is transmitted between discs by the molecular friction within the film itself, as distinguished from the transmission of torque between frictionally engaged surfaces of the material itself of the discs and merely lubricated by "thin" films therebetween. The torque transmitted is directly proportional to the slip and inversely proportional to the film thickness.

The tension of the spring 45 for one mode of operation, is adjusted so that as acceleration of the motor proceeds, the weights will force the discs into direct contact with each other at a speed of the motor somewhat less than full speed, but this is delayed by the dashpot 33—34, which retards the outward movement of the weights as follows.

When the motor starts the weights immediately start to move outwardly, and the fingers 32 engaged with the flange 41, move the piston 34 outwardly in the cylinder 33. The piston at once passes the ports 47, and this occurs before centrifugal force on the oil begins to empty the cylinder 33 through these ports. The oil is thus trapped in the cylinder beyond the ports 47, and escapes at a retarded rate around the piston rod through the hole 40 and causes the piston to be moved slowly, thereby introducing a time interval of delay.

The motor thus can accelerate up to full speed before the weights can move the disc sets close enough together to transmit torque, and therefore comes up to full speed without load. The weights however continue to move outwardly, and the oil films between the discs continue to be made thinner, and finally begin to transmit torque with the "thick" film action referred to, and the stationary discs begin to rotate the sprocket wheel 44 and accelerate the load.

If the load is light the motor will continue to run at full speed, and the weights, finally opposed by the spring 45 alone (the piston 34 having reached the end of its retarding stroke) will move the disc sets into direct mutual contact and transmit torque and drive the load without slip; but the load will have been accelerated up to substantially full speed by the film torque transmission before the discs come into actual contact.

However, if there be considerable driven load, then as the load driving torque begins to develop in the films between the disc sets as the discs are moved closer together, the motor will thereby be slowed down somewhat from full speed (as is well known), and the centrifugal force on the weights will decrease accordingly, and the disc sets will not come into direct mutual contact, but will stop moving closer together. A condition of balance is thus reached between the force of the spring 45 and the centrifugal force, at which the load driving torque will be transmitted through the disc films, and with a corresponding amount of slip between the disc sets; and at which the transmitting films will have a corresponding thickness. The device is now in full operation.

If the load now being driven should increase for any reason, it will tend to slow down the motor still more, and the spring-opposed weights will allow the disc sets to separate still more and increase the thickness of the films and reduce the transmitted torque and increase the slip; and a new balance will be reached.

In this manner, the maximum amount of torque transmitted with slip is determined by the spring 45 and can be adjusted thereat.

From the foregoing, it will be seen that the motor is protected against overload by being allowed to accelerate to full speed before the driven load comes on it, and that then as the load is accelerated, or, after acceleration if it increases, the motor is protected against overload by the slip.

The action referred to above by which the discs of the disc sets tend to be spaced apart, is supplemented by an action which forces them apart and, which forms and maintains the films, and augments the torque transmitted by the films, which will now be described.

As mentioned, the rotating outer annular housing element 10 has an annular mass of oil 54 therewithin. This annular mass of oil is deep enough radially, to keep the annular faces of all of the discs submerged. The oil is free to flow through and around and between the discs, openings 55 being provided in the discs 22 to facilitate free distribution of the oil. Oil thus finds its way between the discs 22—22 of the driven set.

At a number of points, such as three, around the discs 21—21—21 at their outer peripheries, they have radial openings or slots 56 therethrough, the opposite edges of which are beveled off, making these edges in the form of wedges 57. These openings or slots 56 also contribute to the free distribution of the oil to the faces. As the discs 21 are rotated through the oil between themselves and the driven discs 22, these wedges divide and spread apart the oil, and force it with pressure between the two sets of discs, forcibly separating them by axially directed oil pressure; and at the same time the oil in the spaces between the discs being by this means subjected to axially directed pressure by the wedges, the torque transmitted by the films is thereby augmented.

It will be apparent that there is no frictional wear on the discs at any time. When the discs are in mutual contact there is no slip and no wear. When slip begins as above referred to, the above described oil wedging action immediately develops and exerts a positive separating force in opposition to the centrifugal action of the weight cams 30 and separates the discs out of mutual contact and prevents frictional wear.

To insure that the discs will not be subject to frictional wear, at the time of moving into direct mutual contact, means is provided to cause them to move quickly or jump into contact. To this end, the piston rod 39 has a portion 58 of reduced diameter which reaches the escapement hole 49 just before the discs engage, by which the retardation by the dash pot is discontinued and the weights move outwardly quickly and quickly engage the discs.

The torque transmitting thick films are continuously formed and maintained by the supply of oil in the annular mass of oil referred to, at the annular surfaces of the discs where the films are wanted, the openings 55 and 56 contributing to the supply of film maintaining oil, and acting as oil reservoirs from which the films are formed.

While the wedges 57—57 to form and maintain the films under axially directed pressure as described are shown and described as on the motor driven discs, it will be apparent that they may be on the load driving discs instead.

As an illustrative embodiment of the invention, five discs have been shown, providing four torque transmitting films. Obviously, more discs and more films may be employed when the transmission of greater torque with a given diameter of discs is wanted. Also in some cases, a single film may suffice, and only two discs will be needed. The underlying principle is that of one film between two discs.

While I prefer to utilize the wedging action on the oil by the wedges 57—57 as described, in some cases these wedges may not be necessary, and plain unslotted discs may be used.

From the foregoing it will be seen that the motor 2 may always run at substantially constant speed, or at an efficient speed, and that the speed ratio of transmission will vary from a one-to-one ratio, to less than one-to-one ratio, for different loads or as a given load varies; and that the transmission is applicable to drive a load always with slip, or to drive a load without slip except momentary slip when a momentary peak of load occurs.

The transmission of torque by the internal friction of thick oil films as described generates heat. This can be conducted away and dissipated by cooling the rotating housing by external radiating fins formed on the housing members as shown at 59—59.

One of the advantages of the transmission as described is that when driving a load any pulsation of the load or sudden momentary changes of the load tending to produce shock, are absorbed by a momentary slip, or by a change of slip, if slip is present, and all shock and its effects are ironed out.

In Fig. 8 is shown a modification in which the dash-pot action and its time interval of delay are not provided. In this form, the flange 41, against which the centrifugal fingers 32 engage, is connected by a rod 60 to a second flange 61, both flanges having a sliding fit in a bore 62 in the central bore 4 whereby the finger engaged flange 41 is prevented from tipping and so that it will be engaged alike by all of the fingers 32. The weight 31 may straddle the opening 44 and rest upon the core 4 as a stop for the arm 29 when the spring 45 is pre-loaded. Otherwise these parts are the same as those in Fig. 1, and therefore have been only fragmentarily shown.

In operation, the weights will start to move out when the centrifugal force developed at the fingers 32 balances the force of the spring 45. As they move out, the centrifugal force on the fingers increases but the counter force of the spring as it is compressed more and more also increases. The spring is adjusted, so that at a preselected motor speed less than full speed, the centrifugal force and the spring will balance each other with a predetermined amount of slip at the discs. Then during acceleration of the motor up to that speed the discs will be out of engagement and permit the motor to accelerate with less than full load upon it with the advantages above described.

In some cases, it may be desirable to adjust the delay effected by the dash-pot when it is employed. One such adjustment is shown fragmentarily in Fig. 9, parts now shown being the same as in Fig. 1. The piston 63 has a tubular piston rod 64, with ports 65—65 in the tubular wall, the tubular piston rod having a close but sliding fit in a hole 66 in the cylinder head 35. The flange 41 engaged by the centrifugal weight fingers 32 is attached to the piston rod outwardly of the head 35.

A valve port 67 is provided through the piston 63 aligned with the tubular piston rod 64. A needle valve stem 68 is threaded as at 69 to the inside of the piston rod 64 and carries a needle valve 70 aligned with the valve port 67. The valve stem continues outwardly and has sliding fit in a bore 71 in the spring adjusting screw 72, and at its end has a screw driver slot accessible through the bore 71. Oil, trapped in the cylinder 33 after the piston passes the ports 47, flows through the ports 65—65 and out at the valve port 67 and the rate of flow and rate of movement of the piston is adjusted by turning the valve stem 68.

In my co-pending application, Serial Number 592,746, filed May 9, 1945, now Patent No. 2,576,156, I have shown and described a power transmission comprising relatively rotatable discs, transmitting torque therebetween through thick films as described herein. In that application, the films between the discs are continuously maintained by circulating oil, to and from the discs, and supplying oil at the discs to the radially intermediate portions of their film surfaces.

In the present application as will now be clear, torque is transmitted by films between discs, in a manner similar to that of the aforesaid pending application; but here the films are maintained between the discs by causing them to be at all times (during rotation) submerged in a mass of oil, or, more particularly, in an annular ring of oil, as described.

A part of the present invention therefore is in this said means for maintaining the oil film, apart from its utilization in a clutch type of transmission, and is so claimed herein; this part of the invention being applicable to other types of transmission than the clutch type transmission herein disclosed, and which transmit torque through thick films between discs.

The invention comprehends all changes and modifications which may be made in the foregoing disclosure, and which come within the scope of the appended claims.

I claim:

1. A power transmission comprising a pair of elements and means supporting them for relative rotation, each element having an annular face surrounding its rotational axis, the elements disposed with the faces mutually confronting and parallel; a rotary power input and a driving connection between it and one of the elements to rotatively drive it; a rotary power take-off and a driving connection between it and the other element; the said connections providing for axial movement of the elements a torque transmitting film of liquid in the space between the faces to transmit torque from the input to the output; and means always maintaining the film of torque-transmitting thickness on the entire area of the faces during relative rotation of the elements, comprising a walled housing surrounding the faces of the elements rotatable with the power input and confinedly containing a body of oil submerging the said faces, and mechanism carried by and driven by the power input responsive to the action of centrifugal force thereon, and comprising means engaging at least one of the elements and disposed to exert axial thrust thereon to move it axially to decrease the distance between the faces upon a rise of speed of the power input in a range of speeds below a predetermined high speed only, to decrease the film thickness and increase the transmitted torque, and responsive to speed at or above the predetermined high speed of the power input to exert axial thrust on said element to mutually engage the faces of the elements in actual driving contact.

2. In a power transmission for driving a load, a rotary power input part; a rotary load driving part; said parts being supported to rotate relatively; a pair of torque elements having each an annular face means connecting them to the said two parts respectively to rotate in unison therewith, and to be movable axially relative thereto; the faces disposed in confronting parallel spaced apart relation; means maintaining an oil film between the faces of torque transmitting thickness on the entire area of the faces to transmit torque between the faces and thereby between the rotary power input part and the load driving part, comprising a housing confining a quantity of oil in position to submerge the annular faces during their relative rotation thereof; a spring-opposed centrifugally operated mechanism carried by and driven by the rotary power input and comprising means engaged with at least one of said elements and responsive to centrifugal force action to exert axial thrust thereon to move the said annular faces axially closer together upon an increase of speed of the power input and within a predetermined range of speeds to increase the transmitted torque by decreasing the film thickness; oil deflecting wedging surfaces carried by at least one of the said elements and rendered effective by said relative rotation of the elements to subject the oil in the film to axially directed pressure in the direction to move the faces axially farther apart; and the spring opposition of the centrifugally operated mechanism responsive to permit the faces to be moved farther apart to decrease the transmitted torque upon a decrease of speed of the power input element in said range.

3. In a power transmission, a power input part adapted to be connected to a power source and rotated thereby; a load driving part supported by the power input part and rotatable thereon coaxially; a tier of disc-like elements having mutually confronting parallel annular faces coaxial with the said two parts; and alternate ones of the said elements connected to said parts respectively to rotate therewith and to move relative axially thereof; a housing surrounding the elements and rotatable with the input part; a quantity of oil in the housing disposed in an annular mass by centrifugal force thereon and submerging the said faces and maintaining oil films therebetween of torque transmitting thickness on the entire area of the faces, to transmit torque between the power input and load driving parts; a centrifugal mechanism comprising a weight carried by and rotated by the power input part and movable by centrifugal force, and its movement opposed by spring means, the mechanism comprising means engaged with an end disc of the tier and being responsive to centrifugal movement of the weight to compress the tier and move the element faces closer together upon an increase of speed of the power input part to decrease the film thickness and increase the torque transmitted thereby, and the spring means being preselected to balance the centrifugal force on the weight at speeds within a range of speeds below a predetermined speed, to prevent movement of the element faces into actual contact within said speed range.

4. In a power transmission, a power input part adapted to be connected to a power source and rotated thereby; a load driving part supported by the power input part and rotatable thereon coaxially; a plurality of disc-like elements having mutually confronting parallel annular faces coaxial with the said two parts; and alternate ones of the said elements connected to said parts respectively to rotate therewith and to move relatively axially thereof; a housing surrounding the elements and rotatable with the input part; a quantity of oil in the housing disposed in an annular mass by centrifugal force thereon and submerging the said faces to maintain oil films therebetween of torque transmitting thickness, to transmit torque between the power input and load driving parts; a centrifugal mechanism comprising a weight rotated by the power input part and movable by centrifugal force and comprising an axially movable part movable by the weight and spring means opposing axial movement thereof; the axially movable part operable responsive to centrifugal force action to move the element faces closer together upon an increase of speed of the power input part to decrease the film thickness and increase the torque transmitted thereby; and the spring means retracting the axially movable part upon a decrease of speed to permit the disc faces to move farther apart to decrease the transmitted torque, the spring means balancing the centrifugal force action and preventing the axially movable part from moving the element faces into actual contact at speeds within a range of speeds below a predetermined speed.

5. In a power transmission, a power input part adapted to be connected to a power source and rotated thereby; a load driving part supported by the power input part and rotatable thereon coaxially; a plurality of disc like elements having mutually confronting parallel annular faces coaxial with the said two parts; and alternate ones of the said elements connected to said parts respectively to rotate therewith and move relatively axially thereof; a housing surrounding the elements and rotatable with the input part; a quantity of oil in the housing disposed in an annular mass by centrifugal force thereon and submerging the said faces and maintaining oil films therebetween of torque transmitting thickness, to transmit torque between the power input and load driving parts; a centrifugal mechanism comprising a weight rotated by the power input part and movable by centrifugal force and comprising an axially movable part movable by the weight, and spring means opposing axial movement thereof, the axially movable part operable responsive to centrifugal force action to move the element faces closer together upon an increase of speed of the power input part to decrease the film thickness and thereby increase the torque transmitted and to move the faces into direct driving contact at speeds above a predetermined speed; and the opposing spring means retracting the axially movable part to permit the disc faces to move apart upon a decrease of speed below the predetermined speed to cause torque to then be transmitted through the oil film.

6. In a power transmission, a power input part adapted to be connected to a power source and rotated thereby; a load driving part supported by the power input part and rotatable thereon coaxially; a plurality of disc-like elements having mutually confronting parallel annular faces coaxial with the said two parts; and alternate ones of the said elements connected to said parts to rotate therewith respectively and movable relative axially thereon; a housing surrounding the elements and rotatable with the input part; a quantity of oil in the housing disposed in an annular mass by centrifugal force thereon and submerging the said faces and maintaining oil films therebetween of torque transmitting thickness, to transmit torque between the power input and load driving parts; a centrifugal mechanism comprising a weight rotated by the power input part and movable by centrifugal force and comprising an axially movable part movable by the weight, the axially movable part operable responsive to centrifugal force action to move the element faces closer together during increase of speed of the power input part after starting from rest to decrease the film thickness and thereby increase the torque transmitted thereby and responsive to move the element faces into driving contact at a predetermined speed of the input part, attained thereby after starting from rest; and retarding means retarding movement of the axially movable part to delay said movement of the faces into contact; and means rendering said retarding means inoperative upon attainment of substantially said predetermined speed, to cause the axially movable element to effect quick contact engagement of the faces.

7. The transmission described in claim 6 and in which the retarding means comprises an oil containing chamber having a movable wall and a restricted escapement opening for escapement of oil from the chamber on movement of the wall and the movable wall is connected to the axially movable part and retards movement thereof as the oil escapes through the opening, and in which means is provided to increase the size of the escapement opening to discontinue retarding after a predetermined movement of the movable wall and the axially movable part connected thereto.

8. The transmission described in claim 6 and in which the retarding means comprises an oil containing chamber having a movable wall and a restricted escapement opening for escapement of oil from the chamber on movement of the wall and the movable wall is connected to the axially movable part and retards movement thereof as the oil escapes through the opening, and in which means is provided to adjust the size of the opening.

9. In a power transmission, a power input part adapted to be connected to a power source and rotated thereby; a load driving part supported by the power input part and rotatable thereon coaxially; a plurality of disc-like elements having mutually confronting parallel annular faces coaxial with the said two parts; and alternate ones of the said elements connected with said parts to rotate therewith respectively and movable relative axially thereof; a housing surrounding the elements and rotatable with the input part; a quantity of oil in the housing disposed in an annular mass by centrifugal force thereon and submerging the said faces maintaining oil films therebetween of torque transmitting thickness, to transmit torque between the power input and load driving parts; a centrifugal weight mechanism rotated by the power input part and comprising a centrifugal weight and a part movable axially by centrifugal movement of the weight, the axially movable part operable to move the element faces closer together during increase of speed of the power input part after starting from rest to decrease the film thickness and increase the torque transmitted thereby and to move the faces into driving contact at a predetermined speed attained by the input part; retarding means retarding movement of the axially movable part to delay movement of the faces into contact; spring means opposing said movement of the axially movable part, and effective to retract it to permit the faces to move out of contact upon reduction of speed of the input part below the predetermined speed; oil deflecting wedging surfaces carried by at least some of the disc like elements, and rendered effective by relative rotation of the disc like elements to subject the oil between the faces to axially directed pressure in the direction to move the faces axially farther apart, effective to do so when the axially movable part is retracted.

References Cited in the file of this patent

UNITED STATES PATENTS

| Number | Name | Date |
|---|---|---|
| 719,033 | Norris | Jan. 27, 1903 |
| 923,565 | Newcomb | June 1, 1909 |
| 2,015,626 | Heath | Sept. 24, 1935 |
| 2,079,724 | Van Ranst | May 11, 1937 |
| 2,427,432 | Wilhelmy | Sept. 16, 1947 |

FOREIGN PATENTS

| Number | Country | Date |
|---|---|---|
| 101,740 | Germany | Feb. 23, 1899 |
| 401,889 | Great Britain | Nov. 23, 1933 |